United States Patent
Yasuda et al.

(10) Patent No.: US 6,940,078 B2
(45) Date of Patent: Sep. 6, 2005

(54) STATE DETECTING DEVICE FOR SHEET-LIKE IMAGE RECORDING MEDIUM

(75) Inventors: Hiroaki Yasuda, Minamiashigara (JP); Yasunori Ohta, Hadano (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 248 days.

(21) Appl. No.: 10/372,208

(22) Filed: Feb. 25, 2003

(65) Prior Publication Data

US 2003/0160196 A1 Aug. 28, 2003

(30) Foreign Application Priority Data

Feb. 25, 2002 (JP) ............................................. 2002-048622

(51) Int. Cl.[7] ............................................. G03B 42/04
(52) U.S. Cl. ................................. 250/484.4; 250/580
(58) Field of Search ....................... 250/484.4, 580, 250/581, 582; 378/193, 197, 198; 399/23, 49; 358/488

(56) References Cited

U.S. PATENT DOCUMENTS

| | | | | |
|---|---|---|---|---|
| 4,865,967 A | * | 9/1989 | Shiraishi et al. | 435/6 |
| 5,049,924 A | * | 9/1991 | Moro et al. | 355/50 |
| 5,061,994 A | * | 10/1991 | Takahashi | 348/74 |
| 5,917,616 A | * | 6/1999 | Chou et al. | 358/488 |
| 6,702,459 B2 | * | 3/2004 | Barnes et al. | 378/197 |
| 6,703,849 B2 | * | 3/2004 | Ishioka et al. | 324/750 |
| 2003/0021608 A1 | * | 1/2003 | Morita et al. | 399/23 |
| 2003/0075936 A1 | * | 4/2003 | Hsu et al. | 294/1.1 |
| 2004/0079908 A1 | * | 4/2004 | Ohkubo | 250/582 |
| 2004/0136738 A1 | * | 7/2004 | Yamamoto et al. | 399/49 |

FOREIGN PATENT DOCUMENTS

| | | |
|---|---|---|
| JP | 58-33540 | 7/1983 |
| JP | 3-2344 | 1/1991 |
| JP | 7-36130 | 2/1995 |
| JP | 2568931 | 1/1998 |
| JP | 2001-147298 | 5/2001 |

* cited by examiner

*Primary Examiner*—Otilia Gabor
(74) *Attorney, Agent, or Firm*—Sughrue Mion, PLLC (57) ABSTRACT

When an output voltage from an acceleration sensor is judged as being larger than a reference voltage of a reference voltage setting unit, a comparator outputs a pulse signal to a holding circuit. The holding circuit holds a high-level energization signal, and an LED is energized by the energization signal supplied from the holding circuit, informing the operator that an excessively large external force has been applied to the cassette.

14 Claims, 10 Drawing Sheets

STATE DETECTING DEVICE FOR SHEET-LIKE IMAGE RECORDING MEDIUM

BACKGROUND OF THE INVENTION

1. Field of the Invention

The present invention relates to a state detecting device for detecting possible damage to a sheet-like image recording medium such as a stimulable phosphor sheet, for example.

2. Description of the Related Art

There is known a radiation image information recording and reading system, or a so-called CR (Computed Radiography) system, which employs a stimulable phosphor which, when exposed to an applied radiation (X-rays, α-rays, β-rays, γ-rays, electron beams, ultraviolet radiation, or the like), stores a part of the energy of the radiation, and, when subsequently exposed to applied stimulating light such as visible light, emits light in proportion to the intensity of the stored energy of the radiation. In the CR system, the radiation image information of a subject such as a human body is temporarily recorded as a latent image in a stimulable phosphor sheet that comprises a stimulable phosphor layer in the form of a sheet. Then, stimulating light such as a laser beam is applied to the stimulable phosphor sheet to cause the stimulable phosphor sheet to emit light representing the recorded radiation image information. The emitted light is photoelectrically read to produce an image signal. Based on the image signal, the radiation image information of the subject is outputted or reproduced as a visible image on a recording medium such as a photographic photosensitive medium or a display unit such as a CRT.

Various types of CR systems are known in the art. One known type of CR system comprises a radiation image information recording apparatus for recording the radiation image information of a subject on a stimulable phosphor sheet and a radiation image information reading apparatus, separate from the radiation image information recording apparatus, for reading the radiation image information from the stimulable phosphor sheet. In this CR system, a cassette storing a stimulable phosphor sheet is loaded into the radiation image information recording apparatus, which records radiation image information on the stimulable phosphor sheet, or a cassette storing a stimulable phosphor sheet which carries recorded radiation image information is loaded into the radiation image information reading apparatus, which reads the recorded radiation image information from the stimulable phosphor sheet.

When a cassette with a stimulable phosphor sheet stored therein is transferred between the radiation image information recording apparatus and the radiation image information reading apparatus, if the cassette accidentally drops or impinges on a hard object, the cassette itself or the stimulable phosphor sheet stored therein may be damaged due to the shock.

To solve the above problem, Japanese patent publication No. 58-33540 or Japanese utility model registration publication No. 2568931, for example, discloses a cassette having elastic corner members made of rubber or elastic plastic which are positioned on the respective corners for protecting the cassette against damage when the cassette drops on top of a hard object. The disclosed cassette is highly durable and reduces impact forces applied to a stimulable phosphor sheet therein.

However, if excessively large shocks are applied to the cassette or regions of the cassette other than the corners, the cassette itself may possibly be damaged, preventing the stored stimulable phosphor sheet from being removed, or the stimulable phosphor sheet stored in the cassette may possibly be damaged. Particularly, when subjected to such shocks, a stimulable phosphor sheet, which comprises a stimulable phosphor layer disposed on a hard support, is more likely to be damaged than a stimulable phosphor sheet that comprises a stimulable phosphor layer disposed on a flexible support.

When an attempt is made to record radiation image information on the stimulable phosphor sheet without the damage of a cassette or a stimulable phosphor sheet stored therein being noticed, then the radiation image information may not be recorded accurately. If recorded radiation image is to be read from a damaged stimulable phosphor sheet or a damaged cassette, then the radiation image information reading device may malfunction or the radiation image information may not be read accurately.

SUMMARY OF THE INVENTION

It is a general object of the present invention to provide a state detecting device for a sheet-like image recording medium, which is capable of detecting, in advance, the possibility of damage to a sheet-like image recording medium or a cassette which stores such a sheet-like image recording medium therein.

A major object of the present invention is to provide a state detecting device for a sheet-like image recording medium, which is capable of detecting and informing the operator in advance, the possibility of damage to a sheet-like image recording medium or a cassette which stores such a sheet-like image recording medium therein.

Another object of the present invention is to provide a state detecting device for a sheet-like image recording medium, which is relatively simple in arrangement and low in cost.

Still another object of the present invention is to provide a state detecting device for a sheet-like image recording medium, which is capable of reliably recognizing, without oversight, damage to a sheet-like image recording medium or a cassette which stores such a sheet-like image recording medium therein.

Yet another object of the present invention is to provide a state detecting device for a sheet-like image recording medium, which is capable of determining, in advance, whether a sheet-like image recording medium stored in a cassette can be removed from the cassette or not.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

State detecting devices for sheet-like image recording mediums according to preferred embodiments of the present invention will be described in detail below with reference to the accompanying drawings.

Figure 1:
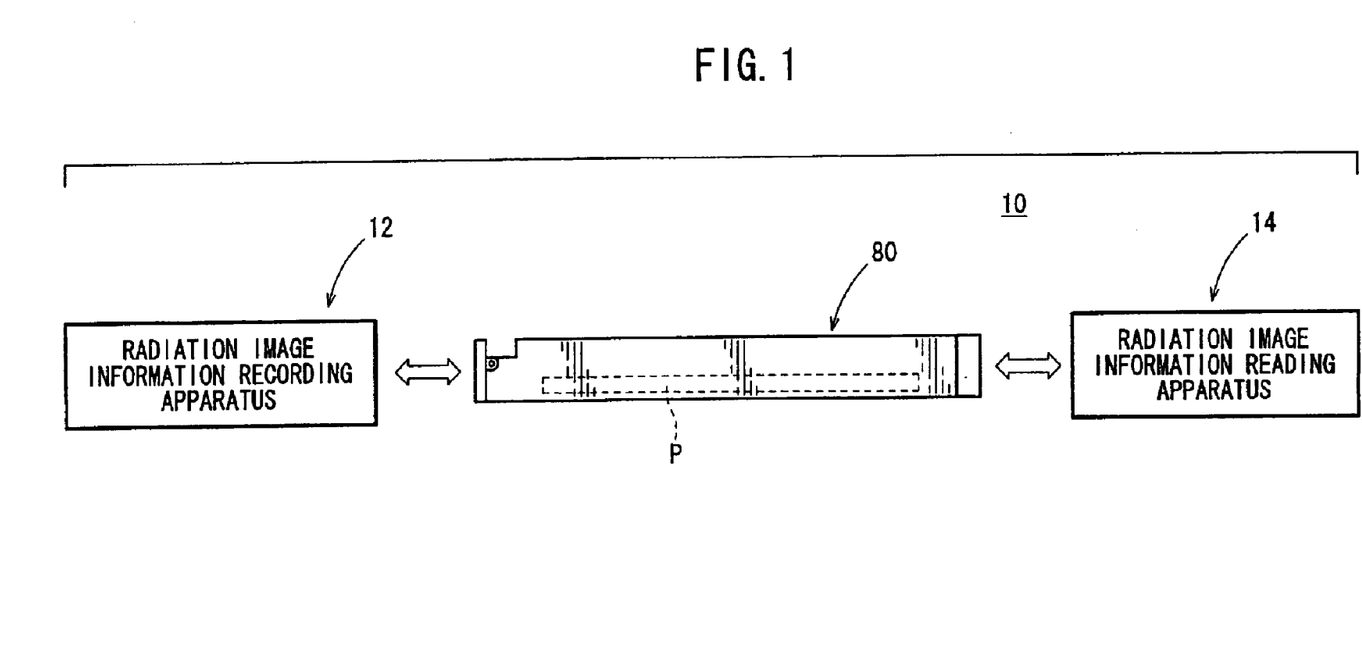
FIG. 1 is a schematic diagram of a radiation image information recording and reading system according to the present invention.

As shown in FIG. 1, a radiation image information recording and reading system 10 basically comprises a radiation image information recording apparatus 12 for temporarily recording the radiation image of a subject such as a human body on a stimulable phosphor sheet P which is a sheet-like image recording medium, a radiation image information reading apparatus 14 for reading the radiation image recorded on the stimulable phosphor sheet P, and a cassette 80 storing the stimulable phosphor sheet P therein and loaded inside the radiation image information recording apparatus 12 or the radiation image information reading apparatus 14.

Figure 2:
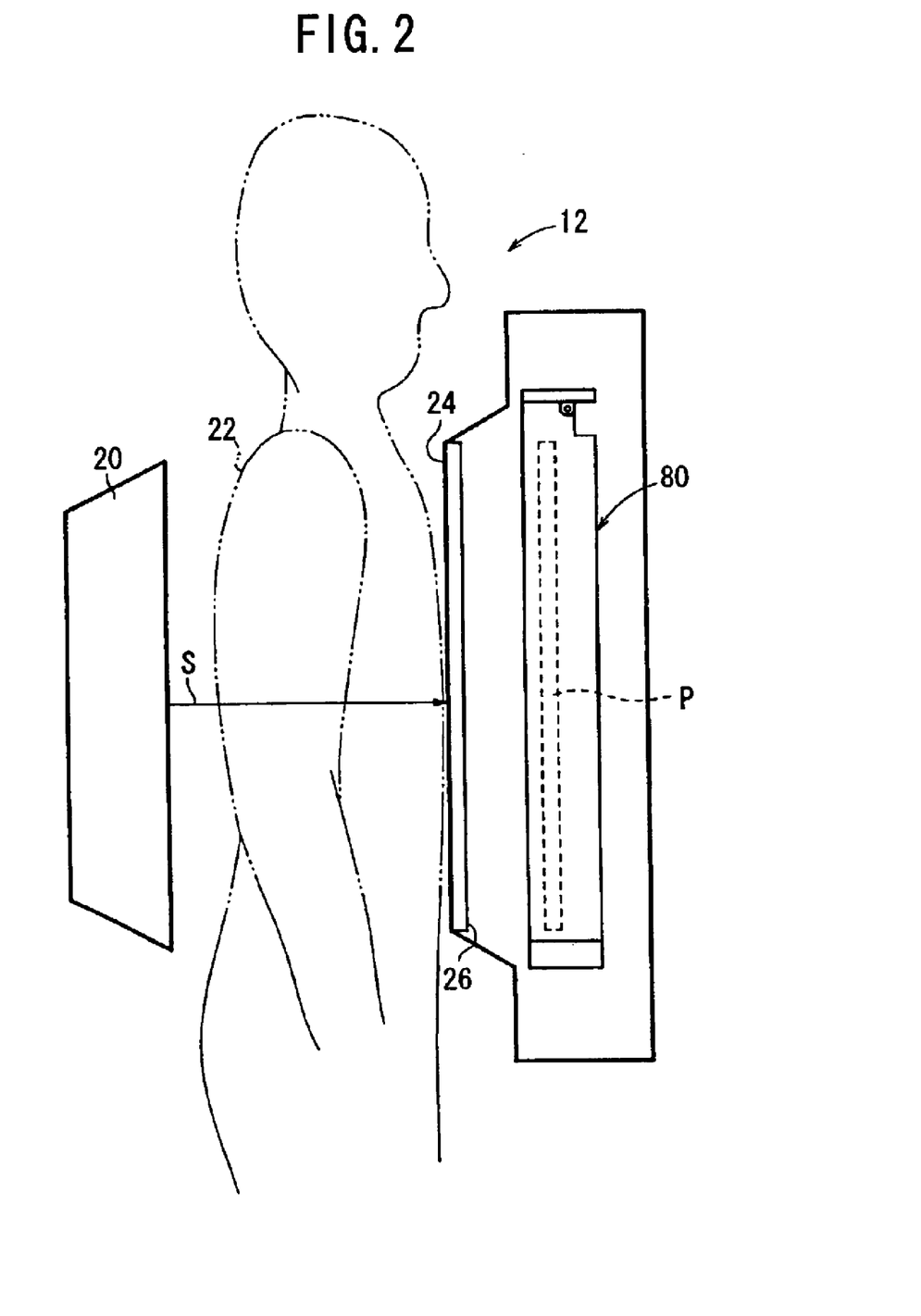
FIG. 2 is a schematic side elevational view of a radiation image information recording apparatus according to the present invention.

FIG. 2 schematically shows the radiation image information recording apparatus 12 in side elevation. As shown in FIG. 2, the radiation image information recording apparatus 12 comprises a radiation source 20 for generating a radiation S, an imaging base 24 made of a radiation-permeable material for holding a subject 22 such as a human body in position thereon, and a grid 26 for removing scattered rays of radiation. The radiation image information recording apparatus 12 holds a cassette 80, which stores the stimulable phosphor sheet P securely in a given imaging position.

Figure 3:
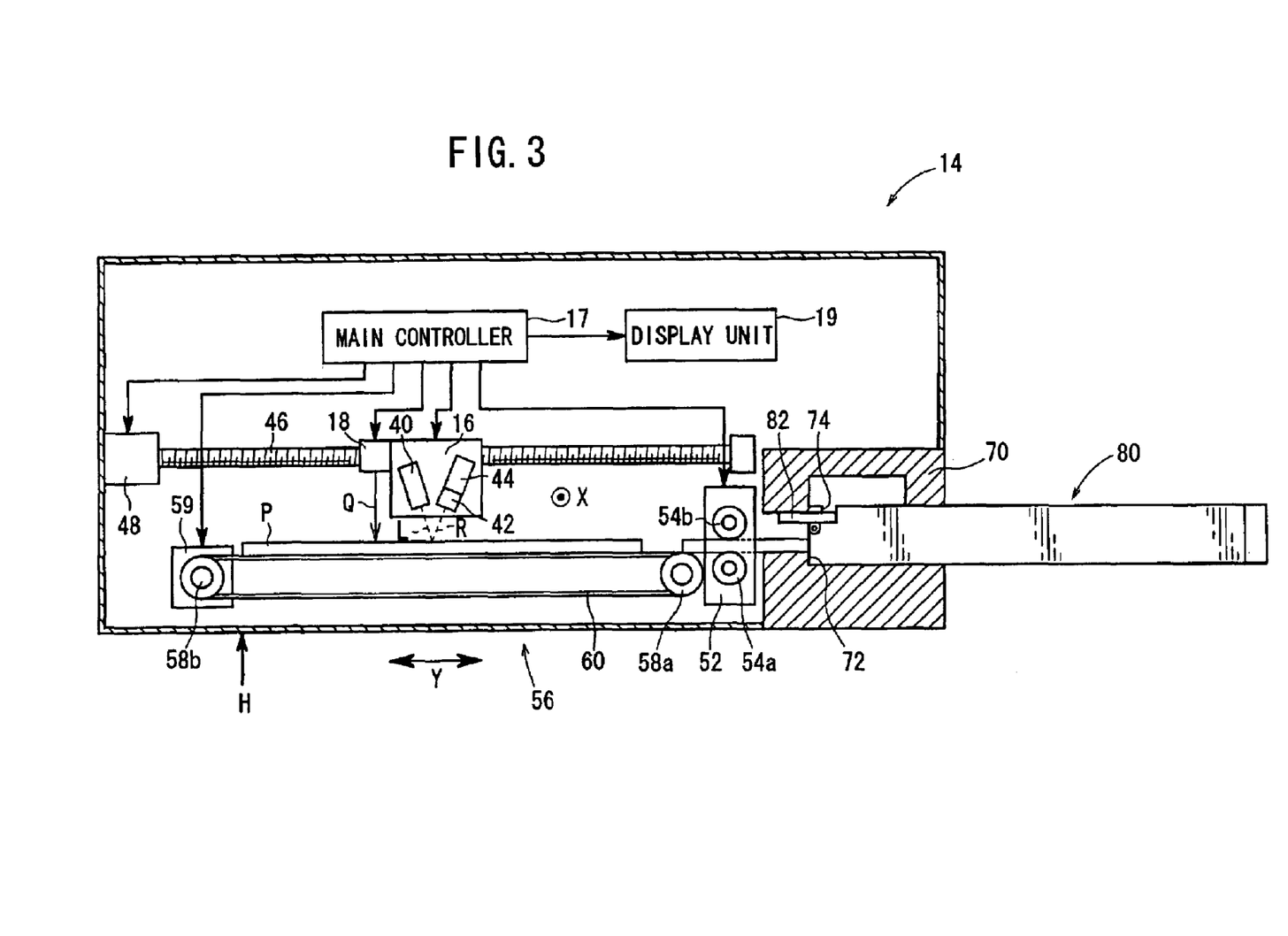
FIG. 3 is a cross-sectional view of a radiation image information reading apparatus according to the present invention.

FIG. 3 schematically shows the radiation image information reading apparatus 14 in cross section. As shown in FIG. 3, the radiation image information reading apparatus 14 basically comprises a reading unit 16 for applying stimulating light L such as a laser beam to the stimulable phosphor sheet P and photoelectrically reading light R that is emitted from the stimulable phosphor sheet P depending on the intensity of the radiation S, an erasing unit 18 for applying erasing light Q to the stimulable phosphor sheet P to discharge radiation energy that is left on the stimulable phosphor sheet P, a cassette holder 70 for holding a cassette 80, a loader/unloader 52 for loading and unloading the stimulable phosphor sheet P into and from the radiation image information reading apparatus 14, a feed unit 56 for feeding the loaded stimulable phosphor sheet P to a reading position, a main controller 17 for controlling the reading unit 16, the erasing unit 18, an actuator 48 (to be described later on), the loader/unloader 52, the feed unit 56, and a display unit 19.

The reading unit 16 comprises a line light source (linear light source) 40, a condensing lens array 42, and a CCD (Charge Coupled Device) 44.

The line light source 40 comprises a laser diode array and a cylindrical lens (not shown). The laser diode array comprises a linear array of laser diodes whose oscillation wavelength is, for example, in the range from 650 to 690 nm. The laser diodes emit divergent stimulating laser beams which are converged in one direction by the cylindrical lens, which produces fan beams. The fan beams are then combined into the stimulating light L that is linearly applied to the stimulable phosphor sheet P.

The condensing lens array 42 comprises an array of graded-index lenses (not shown). The graded-index lenses are provided in parallel to the transverse direction of the stimulable phosphor sheet P indicated by the reference character X. Each of the graded-index lenses converges the light R emitted from the stimulable phosphor sheet P and guides the converged light R to the CCD line sensor 44.

The CCD line sensor 44 comprises an array of sensor chips (photoelectric transducers) parallel to the transverse direction of the stimulable phosphor sheet P indicated by the reference character X. If the width of the stimulable phosphor sheet P is large, then a plurality of CCD line sensors 44 may be arranged in the transverse direction to read the recorded radiation image information from one end to the other widthwise of the stimulable phosphor sheet P.

A filter (not shown) for blocking the stimulating light L reflected from the stimulable phosphor sheet P is inserted between the CCD line sensor 44 and the condensing lens array 42.

The erasing unit 18 has a light source (not shown) such as a cold-cathode fluorescent tube for applying the erasing light Q to the stimulable phosphor sheet P along the transverse direction, for erasing radiation image information remaining on the stimulable phosphor sheet P.

The reading unit 16 and the erasing unit 18 are combined together into a unitary assembly, which is threaded over a ball screw 46 disposed in the radiation image information reading apparatus 14 and extending in the direction indicated by the arrow Y which is perpendicular to the transverse direction indicated by the reference character X. The ball screw 46 has an end connected to an actuator 48 comprising a motor (not shown). When the actuator 48 is energized, it rotates the ball screw 46, displacing the reading unit 16 and the erasing unit 18 together in the direction indicated by the arrow Y.

The cassette holder 70 has a stopper 72 for stopping the cassette 80 against further entry beyond a certain position in the cassette holder 70, and an abutment 74 for opening a cassette lid 82 of the cassette 80, which is inserted into the cassette holder 70.

The loader/unloader 52 comprises a pair of rollers 54a, 54b reversibly rotatable by an actuator such as a motor or the like (not shown). When the rollers 54a, 54b rotate in one direction, they remove the stimulable phosphor sheet P from the cassette 80 and deliver the stimulable phosphor sheet P to the feed unit 56. When the rollers 54a, 54b rotate in the opposite direction, they receive the stimulable phosphor sheet P from the feed unit 56 and deliver the stimulable phosphor sheet P into the cassette 80.

The feed unit 56 comprises an endless feed belt 60 trained around a pair of pulleys 58a, 58b for feeding the stimulable phosphor sheet P in the direction indicated by the arrow Y. One of the pulleys 58b is connected to and rotated by an actuator 59 such as a motor.

The main controller 17 is electrically connected to the reading unit 16, the erasing unit 18, the actuator 48, the loader/unloader 52, and the feed unit 56. The main controller 17 supplies commands to the reading unit 16, the erasing unit 18, the actuator 48, the loader/unloader 52, and the feed unit 56 to enable them to perform desired processes. The main controller 17 also monitors operating states and detects any errors of the reading unit 16, the erasing unit 18, the actuator 48, the loader/unloader 52, and the feed unit 56. Information representing monitored operating states and detected errors is displayed on the display unit 19 under the control of the main controller 17.

Figure 4:
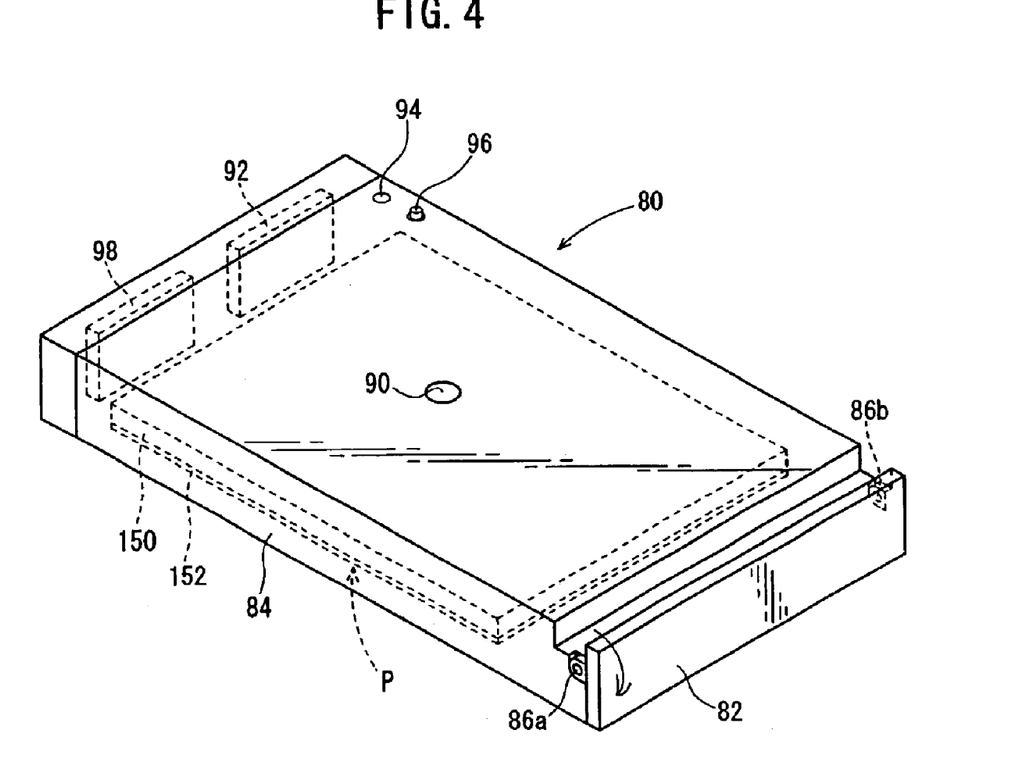
FIG. 4 is a perspective view of a cassette according to a first embodiment of the present invention.

The stimulable phosphor sheet P as the sheet-like image recording medium will be described in detail below. As shown in FIG. 4, the stimulable phosphor sheet P has a phosphor layer 152 of columnar stimulable phosphor bodies evaporated on a transparent support 150 made of a hard material such as glass. The support 150 may also be made of an opaque metal material such as aluminum or stainless steel.

The stimulable phosphor bodies may be evaporated by a vacuum evaporation process in which the stimulable phosphor is evaporated with heat and deposited on a substrate within a vacuum chamber. However, the stimulable phosphor bodies may be deposited in a gas phase according to various processes including sputtering, CVD (Chemical Vapor Deposition), ion plating, etc.

The columnar stimulable phosphor bodies comprise columnar bodies extending substantially perpendicularly to the plane of the phosphor layer 152 and optically independent of each other.

Since the phosphor layer 152 is evaporated on the transparent support 150 according to the present embodiment, the stimulable phosphor sheet P is highly sensitive to the radiation S and reduces the granularity of images that are reproduced from the radiation image information recorded on the stimulable phosphor sheet P. Since the stimulable phosphor bodies of the phosphor layer 152 are optically independent of each other, any dispersion of the stimulating light L applied to the stimulable phosphor sheet P is reduced for making the reproduced image clear.

The cassette 80 as a state detecting device for a sheet-like image recording medium according to the first embodiment will be described below with reference to FIGS. 4 and 5.

FIG. 4 shows in perspective the cassette 80 according to the first embodiment of the present invention. As shown in FIG. 4, the cassette 80 basically comprises a casing 84 for storing the stimulable phosphor sheet P, a cassette lid 82 hinged to the casing 84 at a give position and openable and closable when the stimulable phosphor sheet P is removed from and inserted into the casing 84, a loading/unloading mechanism (not shown) for pushing and pulling the stimulable phosphor sheet P out of and into the casing 84, an acceleration sensor 90 for detecting an acceleration on the cassette 80 and outputting a voltage proportional to the detected acceleration, an LED 94 for indicating the application of an acceleration in excess of an allowable level, applied to the cassette 80, a reset switch 96 for turning off the LED 94, a control board 92 for controlling the acceleration sensor 90, the LED 94, and the reset switch 96, and a power supply 98 for supplying electric energy to the control board 92.

The cassette lid 82 is hinged to an end of the casing 84 by a pair of pivot shafts 86a, 86b. The cassette lid 82 is normally biased into a closed position by a biasing means such as a spring (not shown), as indicated by the arrow in FIG. 4.

The acceleration sensor 90 is disposed as a single sensor substantially centrally on the upper surface of the casing 84. However, a plurality of acceleration sensors 90 may be provided on the casing 84 to detect accelerations on various different regions in various different directions.

Various types of acceleration sensors may be used in the present invention. For example, the acceleration sensor 90 may comprise a movable element that is displaceable in response to an acceleration applied thereto, the movable element having a silicon wafer placed on a spring of polysilicon which extends from another silicon wafer serving as a circuit board. With such an acceleration sensor design, the movable element has a central plate sandwiched between two fixed plates, the central plate and the fixed plates jointly making up a capacitor. The displacement of the movable element is converted into an electrostatic capacitance which is proportional to the displacement of the central plate.

Figure 5:
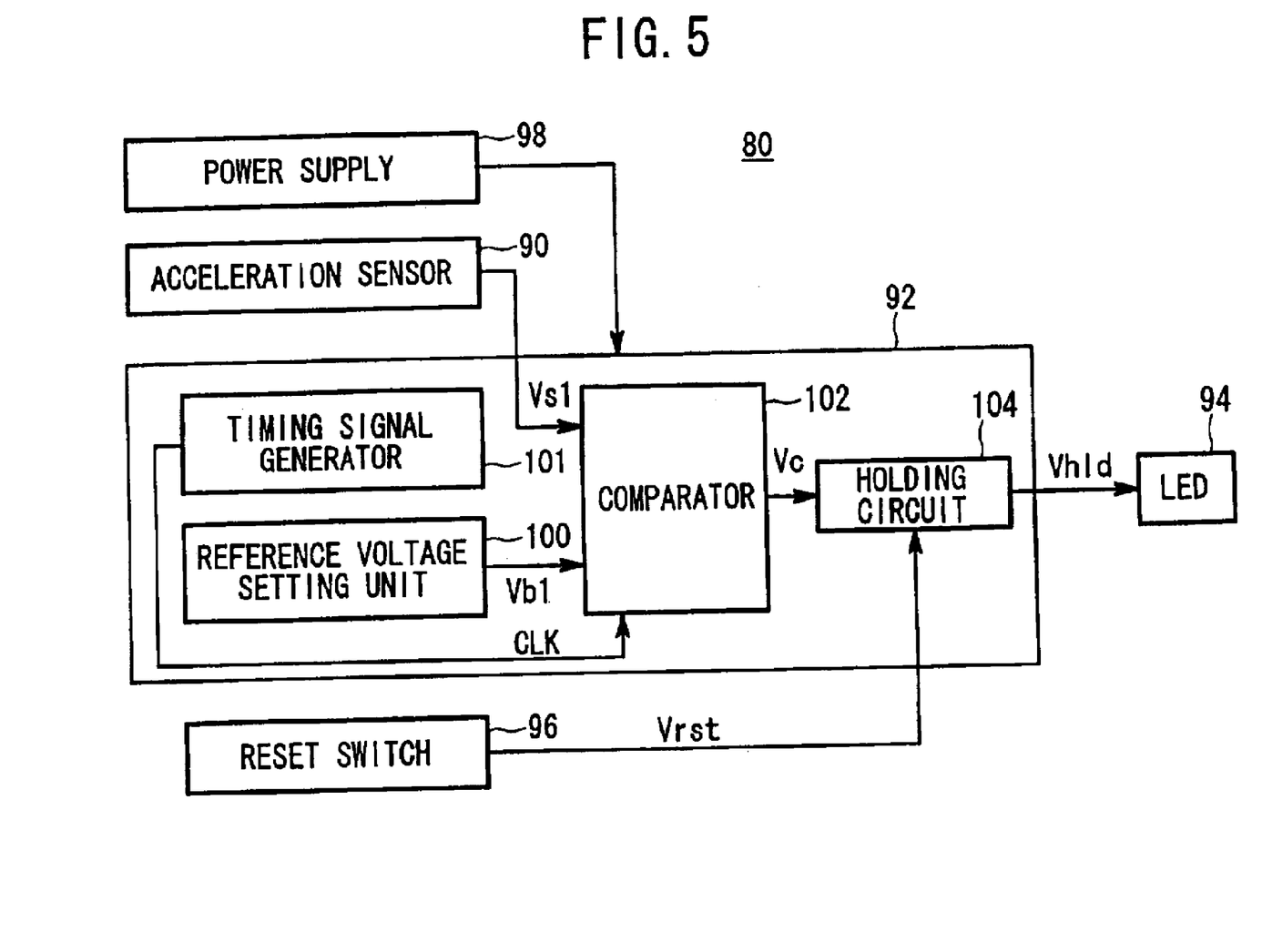
FIG. 5 is a block diagram of a cassette control circuit according to the first embodiment of the present invention.

FIG. 5 shows in block form a cassette control circuit according to the first embodiment of the present invention. As shown in FIG. 5, the control board 92 has a reference voltage setting unit 100 such as a DIP switch for setting a reference voltage Vb1, a comparator 102, a timing signal generator 101 for outputting a comparison timing clock signal CLK for the comparator 102, and a holding circuit 104 such as a flip-flop.

The acceleration sensor 90 applies an output voltage Vs1 generated to one terminal of the comparator 102. The output signal, i.e., the reference voltage Vb1, from the reference voltage setting unit 100 is applied to the other terminal of the comparator 102.

The reference voltage Vb1 is a voltage corresponding to an allowable acceleration. The allowable acceleration refers to an allowable maximum level for accelerations that are applied to the cassette 80 or the stimulable phosphor sheet P when the cassette 80 falls on a hard object, for example. Therefore, the allowable acceleration is an acceleration which does not cause damage to the cassette 80 or the stimulable phosphor sheet P when the acceleration is applied thereto. The allowable acceleration can be set to an optimum value by way of experimentation or the like.

The comparator 102 compares the output voltage Vs1 to the acceleration sensor 90 with the reference voltage Vb1. If the output voltage Vs1 is greater than the reference voltage Vb1, then the comparator 102 generates a pulse signal Vc and outputs the pulse signal Vc to the holding circuit 104.

The holding circuit 104 holds an edge or a high level of the pulse signal Vc, and keeps an energization signal Vhld which energizes the LED 94 in an ON state. The energization signal Vhld held by the holding circuit 104 is reset to a low level by a reset signal Vrst that is supplied from the reset switch 96 operated by the operator.

The power supply 98 should preferably comprise a lightweight long-life cell or a rechargeable cell in view of the possibility that the cassette 80 may be left to stand for a long period of time independently of the radiation image information recording apparatus 12 or the radiation image information reading apparatus 14.

The acceleration sensor 90, the LED 94, and various components mounted on the control board 92 should preferably be of a low power requirement type in order to prolong the electric energy supply capability of the power supply 98.

In the present embodiment, the LED 94 is used as an informing means for indicating that an acceleration in excess of an allowable level was applied to the cassette 80. However, the informing means is not limited to the LED 94, but may comprise an LCD (Liquid Crystal Display) for displaying a message, or a speaker for generating an audio message, a buzzer sound, or a mechanical device for displacing a protrusion to indicate the application of an acceleration.

The reset switch 96 may be replaced with a sensor for detecting an open state of the cassette lid 82. When the sensor detects an open state of the cassette lid 82, it generates a reset signal Vrst to automatically reset the energization signal Vhld. Use of the sensor is effective to avoid any oversight in forgetting to turn off the LED 94 after the cassette 80 is processed in some way, e.g., after the stimulable phosphor sheet P in the cassette 80 is replaced with a new one.

The cassette 80 according to the first embodiment of the present invention is basically constructed as described above. Operation and advantages of the cassette 80 will be described below.

Figure 6:
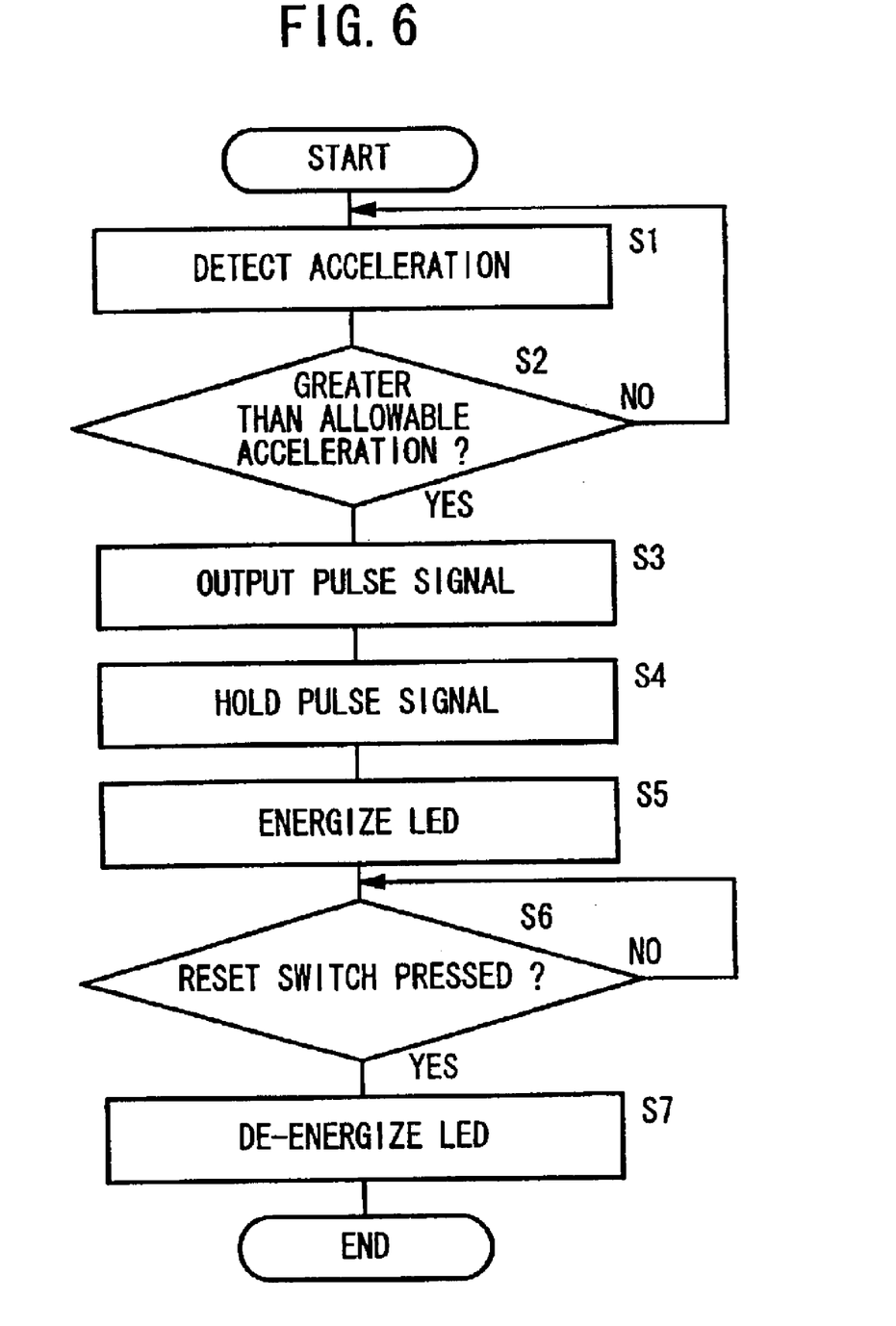
FIG. 6 is a flowchart of a processing sequence of the cassette control circuit according to the first embodiment of the present invention.

FIG. 6 is a flowchart showing a processing sequence of the cassette control circuit according to the first embodiment of the present invention. Before the processing sequence starts, the reference voltage setting unit 100 sets a reference voltage Vb1 corresponding to the allowable acceleration which does not cause damage to the cassette 80 or the stimulable phosphor sheet P stored therein.

In step S1 shown in FIG. 6, the acceleration sensor 90 detects an acceleration applied to the cassette 80, and outputs an output voltage Vs1 representing the detected acceleration to the comparator 102.

In step S2, the comparator 102 compares the output voltage Vs1 with the reference voltage Vb1 based on the comparison timing clock signal CLK from the timing signal generator 101. If the output voltage Vs1 is larger than the reference voltage Vb1, then the processing goes to step S3. If the output voltage Vs1 is smaller than the reference voltage Vb1, then the processing returns to step S1.

If the output voltage Vs1 is larger than the reference voltage Vb1 in step S3, the comparator 102 outputs a pulse signal Vc to the holding circuit 104 in step S3.

In step S4, the holding circuit 104 holds the pulse signal Vc.

In step S5, the LED 94 is energized by an energization signal Vhld based on the pulse signal Vc held by the holding circuit 104, indicating that an acceleration in excess of the allowable acceleration, was applied to the cassette 80 or the stimulable phosphor sheet P stored therein.

Since the LED 94 is energized, the operator can recognize that an excessively large external force has been applied to the cassette 80 or the stimulable phosphor sheet P stored therein, possibly causing damage.

The operator then processes the cassette 80 by replacing the stimulable phosphor sheet P with a new one, and thereafter presses the reset switch 96. If it is confirmed that the reset switch 96 is pressed in step S6, the reset switch 96 generates a reset signal Vrst, which makes the energization signal Vhld low in level, turning off the LED 94 in step S7. If the reset switch 96 is not pressed, then the LED 94 remains energized.

As described above, with the cassette 80 according to the first embodiment of the present invention, the acceleration sensor 90 detects an acceleration applied to the cassette 80 or the stimulable phosphor sheet P stored therein, and if the acceleration is equal to or greater than the allowable acceleration when the cassette 80 drops or impinges on a hard object, the LED 94 is turned on, indicating the possibility of damage to the cassette 80 or the stimulable phosphor sheet P to the operator. Accordingly, the operator can recognize the possibility of a problem with the cassette 80 or the stimulable phosphor sheet P before the cassette 80 is loaded into the radiation image information recording apparatus 12 or the radiation image information reading apparatus 14. As a result, radiation image information is prevented from being recorded onto the damaged stimulable phosphor sheet P. The cassette 80 or the stimulable phosphor sheet P which is damaged is prevented from being loaded into the radiation image information recording apparatus 12 or the radiation image information reading apparatus 14, and hence, from malfunctioning the radiation image information recording apparatus 12 or the radiation image information reading apparatus 14.

The cassette 80 from which damage or trouble has been eliminated is loaded into the radiation image information recording apparatus 12, which records the radiation image information of the subject 22 with high accuracy on the stimulable phosphor sheet P stored in the cassette 80. The cassette 80 which stores the stimulable phosphor sheet P with the radiation image information recorded thereon is loaded into the radiation image information reading apparatus 14, which reads the recorded radiation image information from the stimulable phosphor sheet P.

Specifically, as shown in FIG. 3, when the cassette 80 is inserted into the cassette holder 70, the cassette lid 82 is opened by the abutment 74. Then, the stimulable phosphor sheet P is gripped by the rollers 54a, 54b of the loader/unloader 52, and delivered thereby into the feed unit 56. The feed unit 56 feeds the stimulable phosphor sheet P to a reading position H. The main controller 17 energizes the actuator 48 to rotate the ball screw 46, displacing the reading unit 16 in the direction indicated by the arrow Y. At this time, the stimulating light L emitted from the line light source 40 scans the stimulable phosphor sheet P in the direction indicated by the reference character X, whereupon the stimulable phosphor sheet P emits light R depending on the recorded radiation image information. The light R is emitted through the condensing lens array 42 into the CCD sensor 44, which converts the light R into an electric signal.

After the recorded radiation image information is read by the reading unit 16, any remaining radiation image information is erased from the stimulable phosphor sheet P by the erasing light Q from the erasing unit 18. Thereafter, the stimulable phosphor sheet P is inserted back into the cassette 80, and will be used to record new radiation image information thereon.

A cassette as a state detecting device for a sheet-like image recording medium according to a second embodiment of the present invention will be described below with reference to FIG. 7.

In the first embodiment, the acceleration applied to the cassette 80 is detected by the acceleration sensor 90 to indicate the possibility of damage to the cassette 80 or the stimulable phosphor sheet P stored therein. According to the second embodiment, however, a strain detector 110 (see FIG. 7) is used to detect a strain of the cassette 80 for indicating the possibility of an external force, in excess of an allowable level, applied to the cassette 80a. Those parts of the cassette 80a shown in FIG. 7 which are identical to those of the cassette 80 shown in FIG. 5 are denoted by identical reference characters, and will not be described in detail below.

Figure 7:
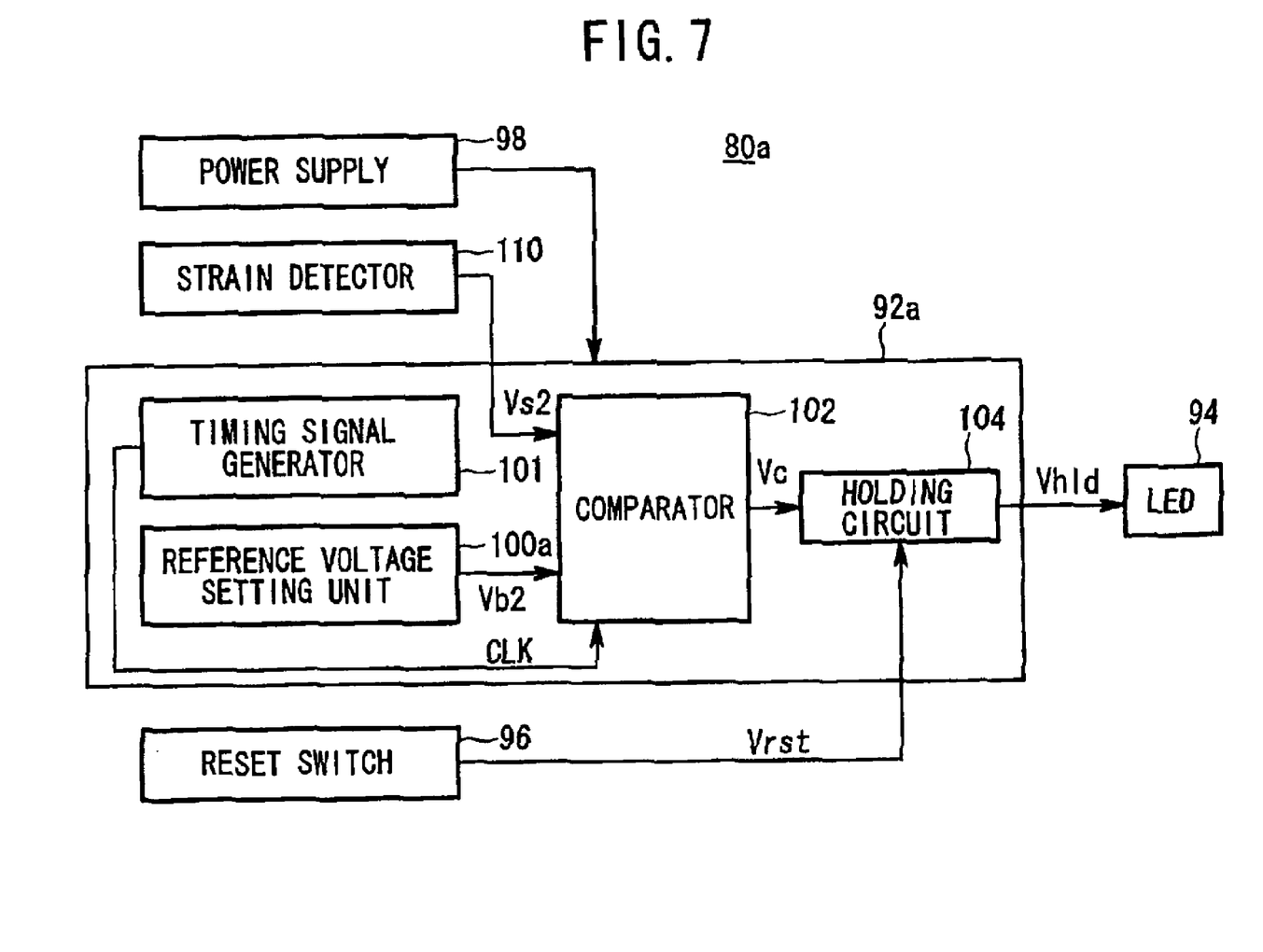
FIG. 7 is a block diagram of a cassette control circuit according to a second embodiment of the present invention.

FIG. 7 shows in block form a cassette control circuit according to the second embodiment of the present invention, the cassette control circuit including a control board 92a in the cassette 80a. The strain detector 110 applies an output voltage Vs2 generated thereby to one terminal of the comparator 102. The output signal, i.e., a reference voltage Vb2, from a reference voltage setting unit 100a is applied to the other terminal of the comparator 102.

The reference voltage Vb2 is a voltage corresponding to an allowable strain. The allowable strain refers to an allowable maximum level for external forces that are applied to the cassette 80a or the stimulable phosphor sheet P when the cassette 80a is deformed, for example. Therefore, the allowable strain is a strain which does not cause damage to the cassette 80 or the stimulable phosphor sheet P.

With the cassette 80a according to the second embodiment of the present invention, the strain detector 110 detects a strain developed in the cassette 80a, and the detected strain is compared with the allowable strain. If the detected strain is larger than the allowable strain, then the LED 94 is energized to inform the operator of the possibility that the cassette 80 or the stimulable phosphor sheet P may have been damaged due to an external force applied thereto.

A cassette as a state detecting device for a sheet-like image recording medium according to a third embodiment of the present invention will be described below with reference to FIG. 8.

In the first embodiment, if the acceleration detected by the acceleration sensor 90 is larger than the allowable acceleration, then the LED 94 on the cassette 80 is energized, and the LED 94 can be de-energized when the reset switch 96 on the cassette 80 is pressed. According to the third embodiment, a cassette 80b does not have the LED 94 and the reset switch 96, but the energization signal Vhld held by the holding circuit 104 is transmitted to a radiation image information reading apparatus 14a in which the cassette 80b is loaded, and the cassette 80b receives the reset signal Vrst for resetting the energization signal Vhld from the radiation image information reading apparatus 14a. Those parts of the cassette 80b and the radiation image information reading apparatus 14a shown in FIG. 8 which are identical to those shown in FIGS. 3 and 5 are denoted by identical reference characters, and will not be described in detail below.

Figure 8:
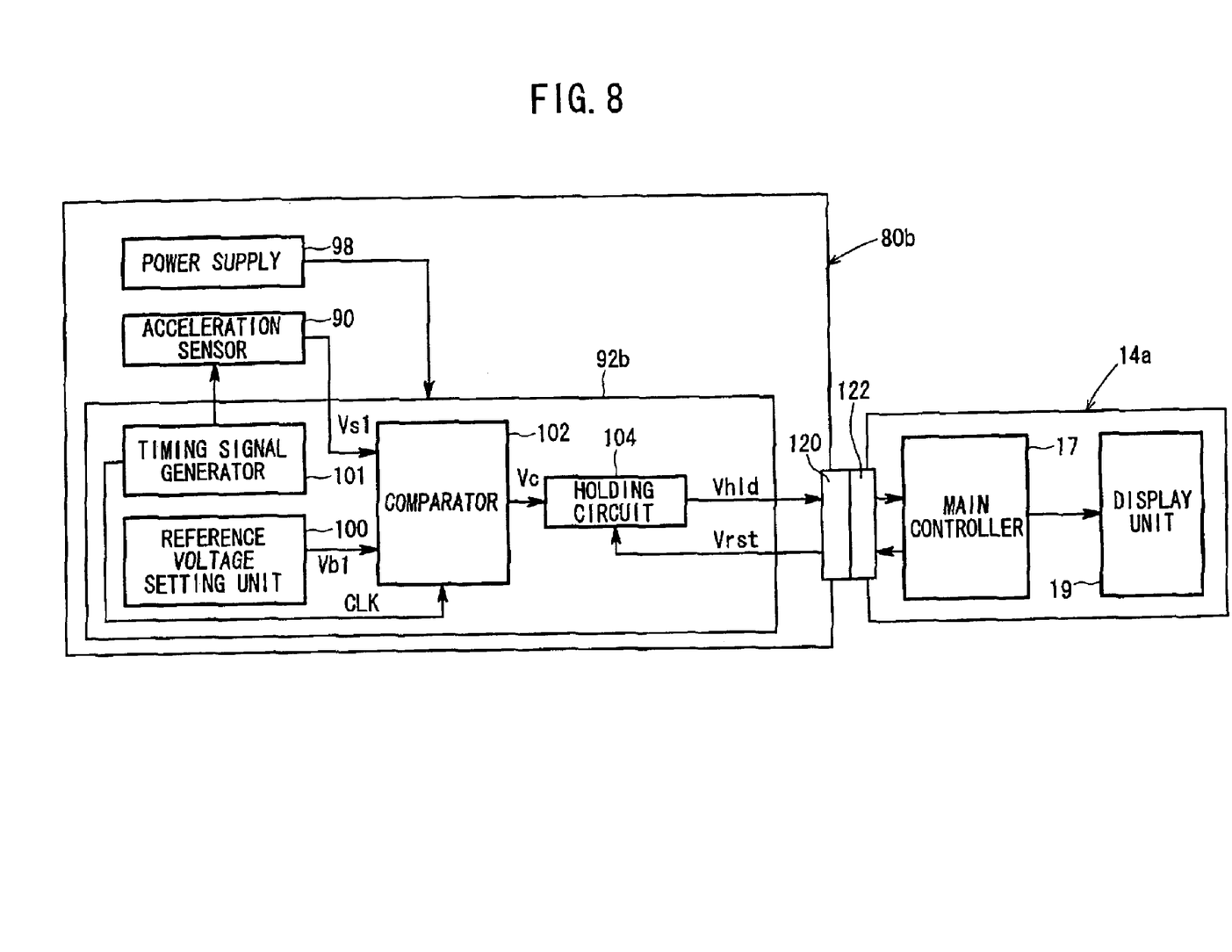
FIG. 8 is a block diagram of a cassette control circuit according to a third embodiment of the present invention.

FIG. 8 shows in block form a cassette control circuit of the cassette 80b and the radiation image information reading apparatus 14a according to the third embodiment of the present invention, the cassette control circuit including a control board 92b in the cassette 80b. As shown in FIG. 8, the cassette 80b has a connector 120, and the radiation image information reading apparatus 14a has a connector 122 for electrically connecting to the connector 120. The holding circuit 104 in the cassette 80b is connected to the connector 120 of the cassette 80b, and the main controller 17 is connected to the connector 122 of the radiation image information reading apparatus 14a.

If an acceleration in excess of the allowable acceleration is applied to the cassette 80b, the holding circuit 104 holds a high-level energization signal Vhld. When the cassette 80b is loaded into the radiation image information reading apparatus 14a, the connectors 120, 122 are electrically connected to each other.

At this time, the energization signal Vhld held by the holding circuit 104 is transmitted through the connectors 120, 122 to the main controller 17. Based on the transmitted energization signal Vhld, the main controller 17 then indicates, through the display unit 19, the possibility that the cassette 30b or the stimulable phosphor sheet P stored therein may have been damaged due to an acceleration in excess of the allowable acceleration, applied thereto. As a result, the operator is able to recognize the possibility of damage to the cassette 30b or the stimulable phosphor sheet P before the radiation image information recorded on the stimulable phosphor sheet P is read by the radiation image information reading apparatus 14a.

Then, the main controller 17 supplies a reset signal Vrst generated by an action of the operator, through the connectors 120, 122 to the holding circuit 104, which resets the energization signal Vhld to a low level. The operator processes the cassette 80b by replacing the stimulable phosphor sheet P with a new one.

In the third embodiment, the display unit 19 is incorporated in the radiation image information reading apparatus 14a. The control board 92a, 92b which includes the comparator 102 may also be incorporated in the radiation image information reading apparatus 14a. With such a modification, the circuitry of the cassette control circuit, except for the acceleration sensor 90 or the strain detector 110 for detecting a state of the stimulable phosphor sheet P, can be shared in the radiation image information reading apparatus 14a, so that the state detecting circuit in the cassette 80 (80a, 80b) can be simplified in circuit arrangement for a reduced cost.

A stimulable phosphor sheet and a radiation image information reading apparatus, which serve as a state detecting device for a sheet-like image recording medium according to a fourth embodiment of the present invention, will be described below with reference to FIGS. 9 and 10.

In the first through third embodiments, a state of the cassette 80 (80a, 80b) is detected to estimate the possibility of damage to the stimulable phosphor sheet P stored therein. However, according to the fourth embodiment of the present invention, the possibility of damage to a stimulable phosphor sheet P1 is directly detected by a radiation image information reading apparatus 14b.

Figure 9:
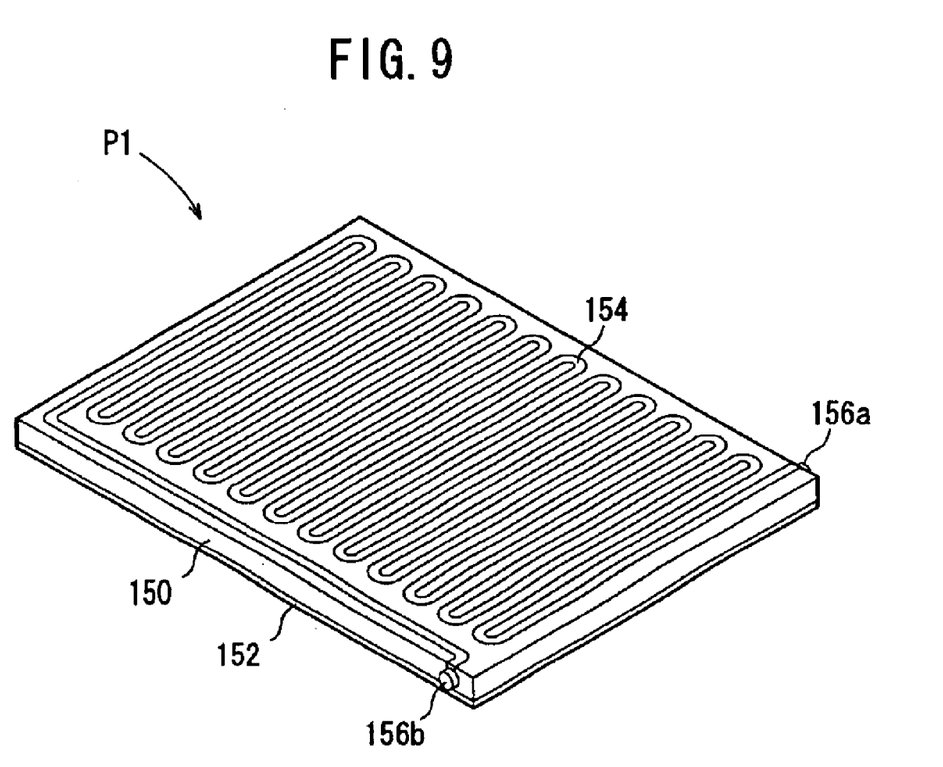
FIG. 9 is a perspective view of a stimulable phosphor sheet according to a fourth embodiment of the present invention.

FIG. 9 shows in perspective a stimulable phosphor sheet P1 as a sheet-like image recording medium according to the fourth embodiment of the present invention. The stimulable phosphor sheet P1 has a phosphor layer 152 of columnar stimulable phosphor bodies evaporated on a support 150 made of a hard material as previously described. The stimulable phosphor sheet P1 also has an electrically conductive pattern 154 in high density disposed on the surface of the support 150 remote from the phosphor layer 152. The electrically conductive pattern 154 is of a nature which does not affect the recording of radiation image information on the stimulable phosphor sheet P1 in the radiation image information recording apparatus 12 and the reading and erasing of radiation image information from the stimulable phosphor sheet P1 in the radiation image information reading apparatus 14. The electrically conductive pattern 154 has opposite ends serving as respective contact terminals 156a, 156b which are exposed on the edges of both sides of the stimulable phosphor sheet P1.

Insofar as the electrically conductive pattern 154 has no adverse effect on the recording, reading, and erasing of radiation image information, the electrically conductive pattern 154 may be disposed either on the phosphor layer 152 or on both surfaces of the stimulable phosphor sheet P1, or may comprise a plurality of electrically conductive patterns. The electrically conductive pattern P1 may be in different densities in different regions.

Figure 10:
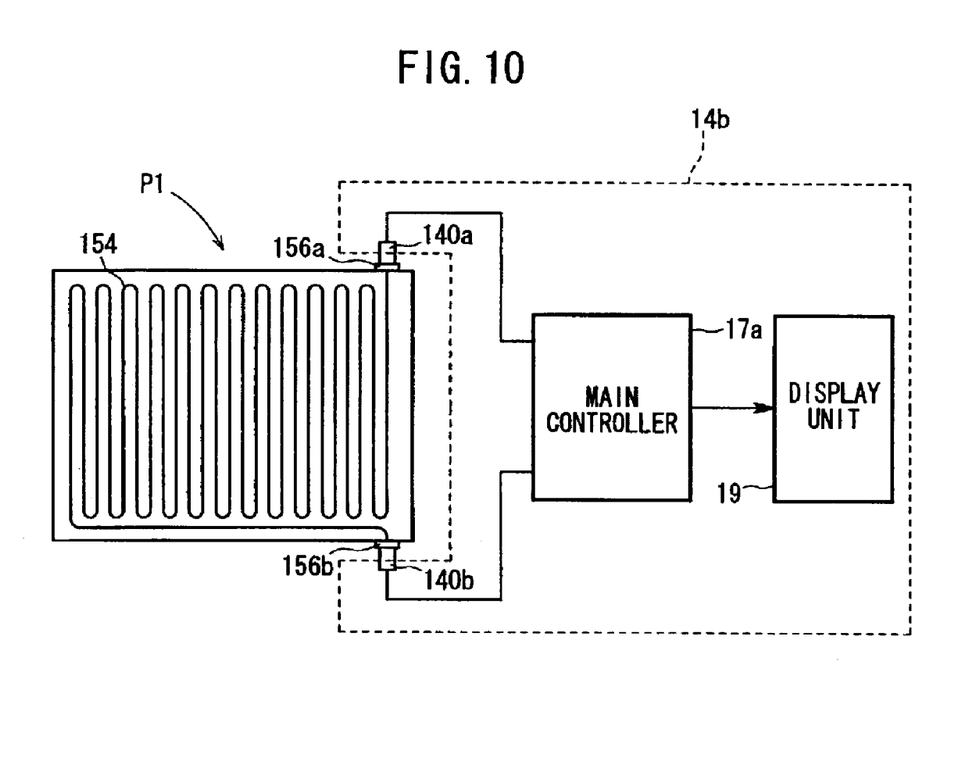
FIG. 10 is a block diagram of a control circuit of a radiation image information reading apparatus according to the fourth embodiment of the present invention.

FIG. 10 shows in block form a control circuit of the radiation image information reading apparatus 14b as a state detecting device according to the fourth embodiment of the present invention. As shown in FIG. 10, the radiation image information reading apparatus 14b includes a main controller 17a having contact terminals 140a, 140b held in contact with the respective contact terminals 156a, 156b of the stimulable phosphor sheet P1. The contact terminals 140a, 140b may be disposed in positions near the cassette holder 70 (see FIG. 3), e.g., in front of or behind the loader/unloader 52.

The radiation image information reading apparatus 14b as the state detecting device according to the fourth embodiment of the present invention is basically constructed as described above. Operation and advantages of the radiation image information reading apparatus 14b will be described below.

When the stimulable phosphor sheet P1 is pushed out of a cassette loaded in the radiation image information reading apparatus 14b, the contact terminals 156a, 156b of the stimulable phosphor sheet P1 are brought into contact with the contact terminals 140a, 140b which are connected to the main controller 17a of the radiation image information reading apparatus 14b.

Then, the main controller 17a supplies an electric current to flow between the contact terminals 140a, 140b, and detects an electric current flowing through the electrically conductive pattern 154. If the detected electric current is equal to or larger than an allowable current, then the main controller 17a can judge that the electrically conductive pattern 154 is free of a fault such as a disconnection and the stimulable phosphor sheet P1 is free of damage. If the detected electric current is smaller than the allowable current, then the main controller 17a can judge that the electrically conductive pattern 154 suffers a fault such as a disconnection or a damage of the support 150 or the phosphor layer 152. The judged result is displayed on the display unit 19 of the radiation image information reading apparatus 14b.

As described above, the radiation image information reading apparatus 14b according to the fourth embodiment confirms the electric conductivity of the electrically conductive pattern 154 to determine whether the electrically conductive pattern 154 suffers a disconnection or not, for thereby directly detecting the possibility of damage to the stimulable phosphor sheet P1.

In the first through third embodiments, the informing means is provided on the cassette 80, 80a or the radiation image information reading apparatus 14a. However, the cassette 80, 80a according to the first and second embodiments may have a communication means such as the connector 120 for communicating with the apparatus (the radiation image information recording apparatus 12 or the radiation image information reading apparatus 14), so that when an acceleration or a strain in excess of an allowable acceleration is applied to the cassette 80, 80a, it can be indicated on both the cassette 80, 80a and the apparatus. Similarly, the control board 92, 92a, 92b and the informing means may be provided on both the cassette 80, 80a, 80b and the apparatus.

With the above modified arrangement, even if the operator overlooks the energization of the LED 94 on the cassettes 80, 80a, since the detected fault of the cassette 80 is displayed on the display unit 19 of the radiation image information reading apparatus 14 when the cassette 80 is loaded into the radiation image information reading apparatus 14, the operator can recognize, without fail, the possibility of damage to the cassette 80 or the stimulable phosphor sheet P stored therein.

The structure of the stimulable phosphor sheet P1 according to the fourth embodiment of the present invention may be stored in the cassette 80, 80a, 80b according to the first through third embodiments, or the cassette 80, 80a, 80b which has both the informing means and the communicating means.

The above modification allows the application of an acceleration or a strain in excess of an allowable level to the cassette 80, 80a, 80b to be detected, and also allows damage to the stimulable phosphor sheet P1 to be directly detected. Consequently, the state of the cassette 80 or the stimulable phosphor sheet P stored therein can accurately be detected. With the informing means such as the LED 94 or the display unit 19 being incorporated in both the cassette 80 and the apparatus, the operator can reliably recognize the possibility of damage to the cassette 80 or the stimulable phosphor sheet P stored therein without fail.

In the third embodiment, when an acceleration in excess of an allowable level is applied to the cassette 80b, the possibility of damage to the stimulable phosphor sheet P is displayed on the display unit 19. After the holding circuit 104 is reset by the reset signal Vrst, the cassette 80b which is possibly damaged or which stores the possibly damaged stimulable phosphor sheet P therein may automatically be discharged from the cassette holder 70. In the fourth embodiment, after the stimulable phosphor sheet P1 is detected as being damaged, the stimulable phosphor sheet P1 may automatically be returned into the cassette 80.

Although certain preferred embodiments of the present invention have been shown and described in detail, it should be understood that various changes and modifications may be made therein without departing from the scope of the appended claims.

What is claimed is:

1. A state detecting device for detecting a state of a sheet-like image recording medium stored in a cassette, comprising:
   an acceleration detector for detecting an acceleration applied to the cassette;
   a comparator for comparing the acceleration detected by said acceleration detector with a predetermined allowable acceleration;
   informing means for indicating a state of the sheet-like image recording medium; and
   control means for energizing said informing means if said acceleration detected by said acceleration detector is larger than said predetermined allowable acceleration.

2. A state detecting device according to claim 1, wherein said sheet-like image recording medium comprises a stimulable phosphor sheet having a support made of a hard material and a phosphor layer of a stimulable phosphor material evaporated on said support.

3. A state detecting device according to claim 1, wherein said informing means is separate from said cassette and connected to said cassette by communicating means.

4. A state detecting device according to claim 1, wherein said comparator, said informing means, and said control means are separate from said cassette, said comparator being connected to said cassette by communicating means.

5. A state detecting device according to claim 1, further comprising:
   a switch for de-energizing said informing means, said switch being connected to said control means.

6. A state detecting device according to claim 1, further comprising:
   an open-state sensor for detecting an open state of said cassette and de-energizing said informing means, said open-state sensor being connected to said control means.

7. A state detecting device for detecting a state of a sheet-like image recording medium stored in a cassette, comprising:
- a strain detector for detecting a strain developed in the cassette;
- a comparator for comparing the strain detected by said strain detector with a predetermined allowable strain;
- informing means for indicating a state of the sheet-like image recording medium; and
- control means for energizing said informing means if said strain detected by said strain detector is larger than said predetermined allowable strain.

8. A state detecting device according to claim 7, wherein said sheet-like image recording medium comprises a stimulable phosphor sheet having a support made of a hard material and a phosphor layer of a stimulable phosphor material evaporated on said support.

9. A state detecting device according to claim 7, wherein said informing means is separate from said cassette and connected to said cassette by communicating means.

10. A state detecting device according to claim 7, wherein said comparator, said informing means, and said control means are separate from said cassette, said comparator being connected to said cassette by communicating means.

11. A state detecting device according to claim 7, further comprising:
- a switch for de-energizing said informing means, said switch being connected to said control means.

12. A state detecting device according to claim 7, further comprising:
- an open-state sensor for detecting an open state of said cassette and de-energizing said informing means, said open-state sensor being connected to said control means.

13. A state detecting device for detecting a state of a sheet-like image recording medium, comprising:
- an electrically conductive pattern disposed on the sheet-like image recording medium;
- disconnection detecting means for detecting whether said electrically conductive pattern suffers a disconnection or not, said disconnection detecting means being connected to connection terminals of said electrically conductive pattern;
- informing means for indicating the state of the sheet-like image recording medium; and
- control means for energizing said informing means if a disconnection of said electrically conductive pattern is detected and de-energizing said informing means if no disconnection of said electrically conductive pattern is detected, based on a detection result from said disconnection detecting means.

14. A state detecting device according to claim 13, wherein said sheet-like image recording medium comprises a stimulable phosphor sheet having a support of a hard material and a phosphor layer of a stimulable phosphor material evaporated on said support.

* * * * *